Patented Sept. 24, 1929

1,729,482

UNITED STATES PATENT OFFICE

THOMAS H. KELLER, OF LANCASTER, PENNSYLVANIA

PROCESS OF ARTIFICIALLY AGING TOBACCO

No Drawing.   Application filed December 30, 1927.   Serial No. 243,765.

The present invention is concerned with the provision of a unique process of artificially aging tobacco. An object of the invention is to provide an expeditious process of this character which will eliminate the necessity for natural aging of the tobacco, and consequently the necessity for storing large quantities of leaf during several years while the natural aging process is going on.

In accordance with the present practice, the necessity for aging the tobacco results not only in tying up a considerable amount of money in the product while it is aging, but results in the needless waste of a tremendous amount of space in which the aging tobacco is stored.

By virtue of the present invention, I reduce the aging period from approximately two to three years, to approximately four to eight weeks; at the same time I produce an artificially aged tobacco having all of the desired flavor and smoking qualities of that which is naturally aged.

The process of artificial aging is carried out substantially as follows. I boil in water a suitable quantity of cereal grass or cereal grasses, so that an extract may be obtained. Grasses suitable for this purpose include hay, clover, timothy, wheat, rye, oats, etc.

Having obtained a cereal grass extract of the proper strength by this method, I dampen the tobacco with the extract, and permit the liquid to thoroughly soak in and be drawn through the tobacco. I then steam the extract-saturated tobacco with the steam produced by boiling the extract, and pack the tobacco thus treated away in the usual cases for a short length of time; say several weeks.

After the tobacco has sweated in the cases for several weeks, it is removed, and again moistened with, or immersed in the extract, and again re-packed for a few more weeks. After this re-sweating, which may take from two to four weeks, the tobacco is completely cured and ready for manufacture into cigars or smoking tobacco.

For certain classes of tobacco leaf, where the cereal grass extracts do not in themselves impart the desired flavor, the extract may be flavored with vanilla or any other suitable flavoring medium, but the process remains the same.

Obviously, the exact time necessary for satisfactorily carrying out the process is dependent on various factors, such for instance as the character of the cereal grass, the strength of the extract, and the age and quality of the tobacco.

Numerous changes and alterations might be made in the process without departing from the invention, or from the spirit and scope of the appended claims.

I claim:

1. A process of artificially aging tobacco which includes the step of moistening the tobacco with an extract of cereal grass and then packing and sweating the moistened tobacco.

2. A process of artificially aging tobacco, which includes the steps of steaming the tobacco with a cereal grass extract, then packing and sweating the tobacco.

3. A process of artificially aging tobacco, which includes the steps of steaming the tobacco with a cereal grass extract, then packing and sweating the tobacco, then again moistening the tobacco with the extract and re-packing and re-sweating it.

4. A process as set forth in claim 2, wherein the tobacco is moistened with the extract and allowed to stand prior to the steaming operation.

5. A process of artificially aging tobacco which includes subjecting the tobacco to an extract of cereal grass and subsequently sweating the tobacco.

6. A process of artificially aging tobacco comprising subjecting the tobacco to an extract of cereal grass, sweating the tobacco, again subjecting the tobacco to the action of an extract of cereal grass and re-sweating the tobacco.

7. A process of artificially aging tobacco, comprising moistening the tobacco with an extract of cereal grass, subjecting the tobacco to vapors from said extract, packing the tobacco, again moistening the tobacco with an extract of cereal grass, and re-packing the tobacco.

8. A process of artificially aging tobacco, comprising dampening the tobacco with a cereal grass extract, steaming the tobacco with a boiling extract of cereal grass, sweating the treated tobacco, again moistening the tobacco with the extract and re-sweating the tobacco.

9. A process of artificially aging tobacco which includes boiling a cereal grass to form an extract, moistening the tobacco with the extract, boiling the extract, and steaming the tobacco in vapors therefrom, sweating the thus-treated tobacco, re-moistening the tobacco with the extract, and re-sweating the tobacco.

THOMAS H. KELLER.